(12) United States Patent
Crouzet

(10) Patent No.: US 7,776,767 B2
(45) Date of Patent: Aug. 17, 2010

(54) LATTICE INTENDED FOR THE CONSTITUTION OF A LIGHT-ATTENUATION SCREEN, WITH SELF-REGULATION OF THE TRANSMITTED LIGHT

(75) Inventor: Aluin Crouzet, Le Touvet (FR)

(73) Assignee: XLScreen S.A.S., Decines Charpieu (FR)

( * ) Notice: Subject to any disclaimer, the term of this patent is extended or adjusted under 35 U.S.C. 154(b) by 133 days.

(21) Appl. No.: 12/001,523

(22) Filed: Dec. 12, 2007

(65) Prior Publication Data

US 2008/0166518 A1    Jul. 10, 2008

(30) Foreign Application Priority Data

Dec. 12, 2006    (FR) .................................. 06 55447

(51) Int. Cl.
*B32B 27/12*    (2006.01)
*B32B 27/04*    (2006.01)

(52) U.S. Cl. ............................... 442/2; 442/20; 442/43; 442/45

(58) Field of Classification Search .................... 442/2, 442/20, 43, 45
See application file for complete search history.

(56) References Cited

U.S. PATENT DOCUMENTS

| 6,068,895 | A  * | 5/2000 | Kimura ....................... 428/29 |
| 6,446,402 | B1 * | 9/2002 | Byker et al. ................ 52/173.3 |
| 7,361,615 | B2 * | 4/2008 | Christou et al. ............... 442/20 |

* cited by examiner

*Primary Examiner*—Ula C Ruddock
(74) *Attorney, Agent, or Firm*—Withers & Keys, LLC

(57) ABSTRACT

This present invention concerns a lattice that is intended for the constitution of a light-attenuation screen, composed of at least two layers of crossed threads or fibres, combined to form an open grid with a given openness factor, characterised in that the layers are coated with a formulation that includes a polymer binder and a photochromic organic pigment.

20 Claims, 4 Drawing Sheets

LATTICE INTENDED FOR THE CONSTITUTION OF A LIGHT-ATTENUATION SCREEN, WITH SELF-REGULATION OF THE TRANSMITTED LIGHT

CROSS-REFERENCE TO RELATED APPLICATIONS

This patent application claims the benefit of priority to French Patent Application Number 0655447 entitled "LATTICE INTENDED FOR THE CONSTITUTION OF A LIGHT-ATTENUATION SCREEN, WITH SELF-REGULATION OF THE TRANSMITTED LIGHT" filed on Dec. 12, 2006 in the name of HEXCEL REINFORCEMENTS, Societe Anonyme, the subject matter of which is incorporated herein in its entirety.

TECHNICAL FIELD OF THE INVENTION

This present invention relates to the field of the crossed-fibre lattice possessing a given openness factor and intended to constitute curtains or blinds that can be used in an internal arrangement in relation to a window, a glass door, or a picture window. The function of such curtains or blinds is generally to attenuate the passage of light in the event of high brightness levels, and to constitute a sort of screen.

BACKGROUND OF THE INVENTION

Lattices of the above type are generally coated with a thermo-plastic material, either by prior coating of the threads or fibres, or coating by immersion, with such coating being intended to confer a suitable resistance to ageing, more particularly when used externally. The coating should also generally be considered as having the specific vocation of a binder used in a heat-welding process to create a connection between the interlaced threads, which are woven in a special weave that can be of any nature, on condition that it allows a non-negligible openness factor to remain, like the type of the articles that are sold as screens for attenuating the passage of light.

The prior art proposes to create such lattices, from two layers of interlaced threads for example, to form a cloth or fabric. The solutions of the prior art are most often created from glass threads or fibres coated with a polymer formulation and then woven, or indeed from glass threads or fibres that are woven and then coated with a polymer formulation by a padding or impregnation process for example. The formulation usually includes one or more polymers chosen from PVC, vinyl and polyurethane binders. These lattices can be sold in the form of lamellae or laminates and are perfectly suited to the creation of laminated curtains to hang vertically, or indeed in the form of roll-up curtains (or "roller blinds").

Variations occur in the light intensity as a function of the weather and the time of day, obliging the user to manually change the positioning of the blind or curtain in order to allow passage of the light to a greater or lesser degree as required.

SUMMARY OF THE INVENTION

One of the objectives of this present invention is to provide a lattice that is intended for the constitution of a light-attenuating screen that is easier to use, while still providing a lattice which is easy to produce at a reasonable production cost.

In this context, the inventors propose to provide a fibrous lattice that is treated with a suitable formulation, with the ingredients of the formulation being selected so as to achieve self-regulation of the colour of the formulation and therefore of the lattice, as a function of the quantity of light received, and as a consequence, regulation of the light transmitted.

The invention also has as its subject a lattice that is intended for the constitution of a light-attenuation screen, composed of at least two layers of crossed threads or fibres, combined to form an open grid with a given openness factor, characterised in that the layers are coated with a formulation composed of a polymer binder and a photochromic organic pigment.

This present invention also has as its subject the blinds or curtains that are made up from a lattice as previously described. According to another of its aspects, the invention concerns a method for the manufacture of a lattice according to the invention which includes a stage for treatment of the threads in the layers constituting the open grid, with a given openness factor, using a formulation that includes a polymer binder and a photochromic organic pigment.

BRIEF DESCRIPTION OF DRAWINGS

The description that follows, with reference to the appended FIGURES, will allow the invention to be understood more clearly.

DETAILED DESCRIPTION OF THE INVENTION

Figure 1:
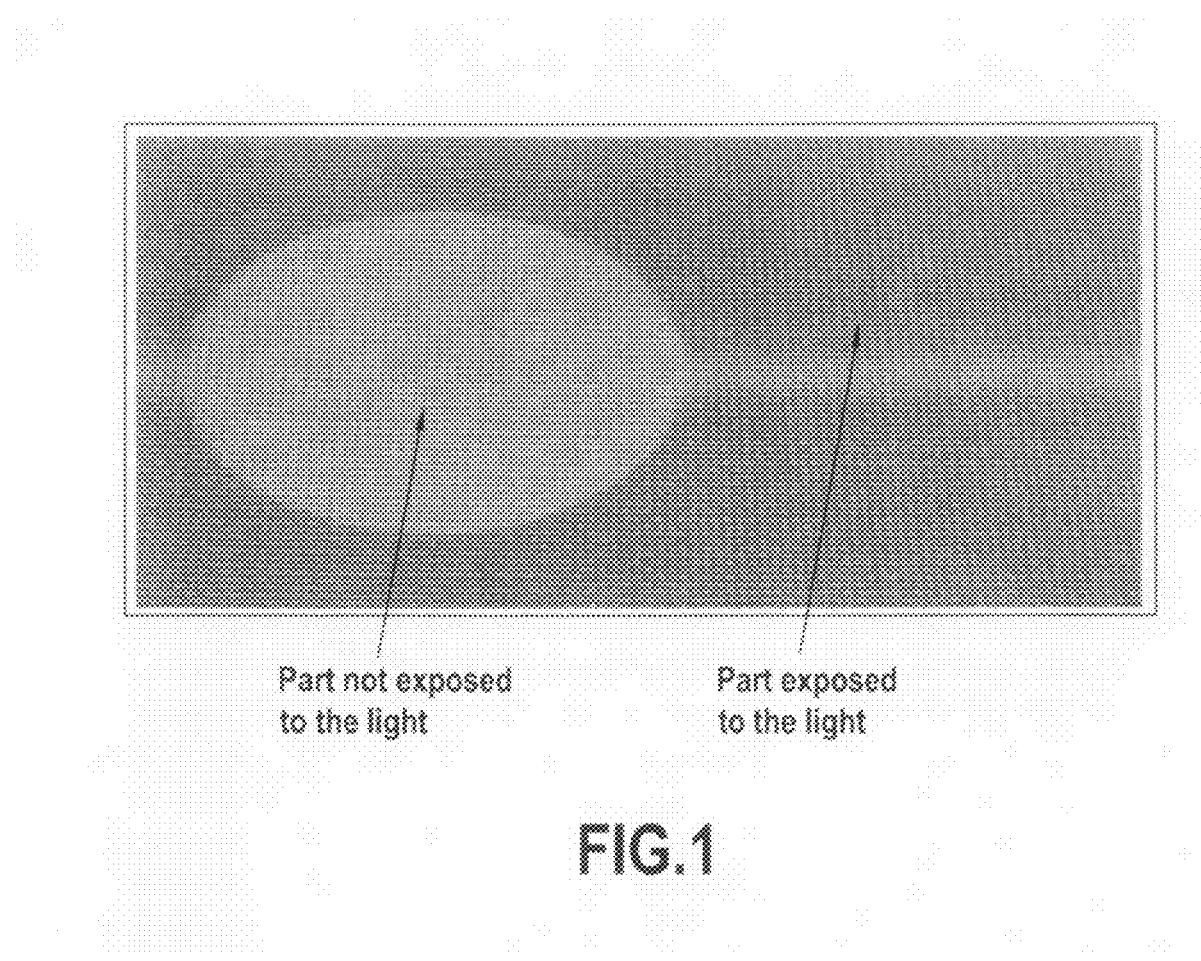
FIG. 1 highlights the change of appearance observed with a lattice according to the invention when the latter is exposed to light.

For the constitution of lattices that are suitable for applications of the blind or curtain type, glass, polyester or polyamide thread or fibre can be used. Before treatment with the formulation based on photochromic pigment, employed in the context of the invention, such threads can be either dry or coated beforehand, with PVC for example. The thread or fibre type lattice can be created by the weaving of two layers of interlaced threads. In particular, such a lattice can be any type of cloth or fabric. It can also be arranged that this grid is composed of two layers of threads that are superimposed without interlacing, with the connection between the two layers being created by any appropriate means. Preferably, the threads are parallel with each other in each of the layers, and are separated by a constant or variable spacing pitch, as described, for example, in WO 99/43879. The threads cross each other, with or without interlacing, so as to form open meshes with a given openness factor. The orientation of the threads in each of the layers is usually such that the threads cross each other at an angle of 90°. The methods employed to create such grids are well known to those skilled in the art. The openness factor, also called the openness rate, is the ratio between the area of the holes in the mesh and the total area of the lattice. This openness depends on the intended application, and is preferably between 2% and 20%, and preferably of the order of 5% or 3%. The lattices described as technical generally exhibit a smaller openness factor, and also allow less light to pass (at constant openness rate) than the lattices that are described as decorative. In applications of the blind type, such lattices can be supplied with a roller mechanism at one of their edges.

In the context of the invention, the layers making up the lattice are coated with a photochromic polymer formulation. The term coating should be interpreted in its broadest sense, meaning that the formulation can be applied onto the layers by any means. The term "coating" is used in this present invention to refer to a thread which has any type of covering applied to its surface. Nevertheless, the term "coating" does not exclude the fact that the coating can also impregnate the thread, so that in this case, the coating is applied not only to the surface of the thread, but also penetrates into at least a part of its thickness. Treatment with the formulation can be effected before or after the constitution of the lattice. The lattice can be impregnated with a polymer solution and, for example, can be achieved by the technique of impregnation which is well known to those skilled in the art, using a "padding" technique for example. In this type of technique, in which the lattice is soaked in a bath of the photochromic polymer formulation, the formulation coats the thread over the whole of its accessible area. It is also possible to deposit the made-up lattice onto a fine layer of polymer formulation in the form of a viscous liquid, where such a layer can be applied with a film applicator. It is also possible to envisage treating the layers of threads only on one face, using the coating technique, by means of a blade or scraper for example.

It is preferable to use a polymer binder that can be mixed with water. In this case, the liquid formulation applied to the layers of thread generally contains a large percentage of water, from 30 to 60% (m/m) for example. After treatment, the lattice is usually subjected to a drying stage intended to eliminate the solvents, and in particular the water, from the formulation. This drying stage is conducted at a temperature within the range from 150° C. to 170° C. for example.

Preferably, the formulation represents from 3 to 20% (m/m), and preferably from 5 to 15% (m/m) of the lattice (corresponding to the sum of the fibre+resin layers). This percentage, like all the percentages given in the description, unless otherwise stated, is a percentage in terms of mass, measured on the finished lattice, meaning that unless otherwise specified, the formulation is the polymer formulation present in the claimed lattice, and not the liquid formulation used to create the lattice.

According to an essential characteristic of the invention, the formulation contains a photochromic organic pigment. This means that the pigment is of a colour that varies as a function of the light. Most often, such a pigment passes from a colourless appearance to a coloured appearance under the action of the light, and this action is reversible. A photochromic response is induced, for example, by a colourless isomer of an organic compound containing a carbon-oxygen link which breaks down under the action of the UV (300 to 360 nm). The colourless isomer contains two localised systems which absorbent only in the UV part of the spectrum. The compound therefore appears colourless. When the carbon-oxygen connection opens, the two systems convert into a single delocalised system which absorbs in the visible spectrum, giving rise to the colouring effect. The photochromic system is excited by the UV. The photochromic organic pigment is preferably chosen to be one of the following:

the spiropyranes, the spiro-oxazines, which exhibit a remarkable behaviour in the face of fatigue (the loss of performance of the photochrome over time because of its chemical degradation, usually due to oxidation), such as the naphto-oxazines, the chromenes, such as the naphtopyrans and benzopyrans, the fulgides and fulgimides, of which the coloured species exhibit good stability in relation to thermal reversion, the diarylethenes, which exhibit properties close to the fulgides, the quinones, the viologens, the perimidinespirocyclohexadieniones, and their derivatives.

Table 1 illustrates examples of compounds for the preferred families:

TABLE 1

| Family | Examples of formulae |
|---|---|
| Spiropyrans | Closed form (Indolinospiropyran) ⇌ (hv₁ / Δ or hv₂) Open form (Merocyanine) (Quinonic form) |
| Spiro-oxazines (naphtho-oxazines) | Closed form ⇌ (hv₁ / Δ or hv₂) Open form (Merocyanine) (Quinonic form) |

TABLE 1-continued

| Family | Examples of formulae |
|---|---|
| Benzo and naphthopyran (Chromene) | 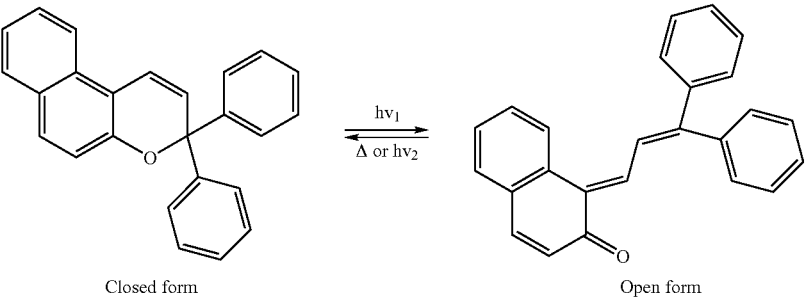 |
| Fulgides and fulmigides | 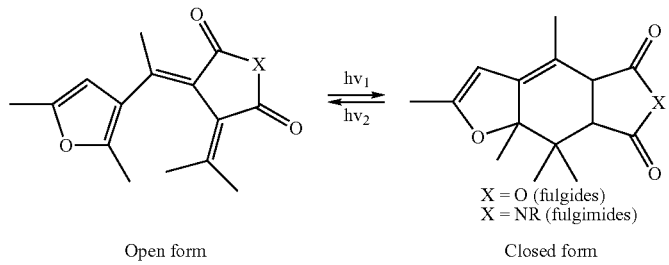 |
| Diarylethines | 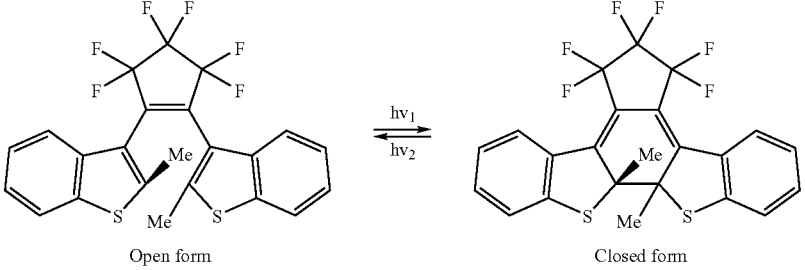 |

In particular, the change of colour of the formulation, leading to a change in the light transmitted, results in a darkening or lightening of the formulation, as illustrated in FIG. 1. FIG. 1 shows the variation in the colour of a lattice according to the invention, between two zones, one of which is exposed to the light and the other is not exposed. In a preferred manner, in the absence of light, the non-activated will have a white colour, and the activated formulation subjected to an intense light will exhibit a black or dark grey colour. The presence of this organic pigment allows self-regulation of the transmitted light by the lattice, as a function of the quantity of light arriving at the latter. As an example of commercial photochromic organic pigments, one could mention PHOTOSOL®, VARIACROL® or REVERSACOL® and more precisely:

the spiro-oxazines commercialised by PPG under the name of Blue PHOTOSOL® 0265, or Yellow PHOTOSOL® 5-3, spiro-oxazine commercialised by Clariant under the name of Blue VARIACROL® A, the pigments marketed by James Robinson, such as:

the naphropyrans: Midnight grey, REVERSACOL® ruby, REVERSACOL® sunflower, REVERSACOL® misty grey, REVERSACOL® 306, REVERSACOL® 219, and REVERSACOL® 208, the naphto-oxazines: REVERSACOL® paltinate purple, REVERSACOL® plum red, and REVERSACOL® velvet blue.

The presence of the pigment in the formulation enables the lattice to perform self-regulation of the transmitted light. The life expectancy of the photochromic pigment will depend, in particular, on its quantity in the formulation, on the stabilisers used, and on the formulation of the polymer binder. In particular, the use of UV absorbers, also known as anti-UV stabilizers, will prolong the life expectancy of the photochrome but will also reduce the colour intensity.

In addition, and in an advantageous manner, the photochromic organic pigment represents from 0.05 to 0.4% (m/m), and preferably from 0.09% to 0.3% (m/m) of the total mass of the lattice. For its part, the polymer binder is selected from the thermoplastic polymers, the heat-hardened polymers, and mixtures of these. The polymer binder is preferably selected from the vinyl, acrylic or polyurethane binders, with the polyurethanes being particularly suitable due to their properties of resistance to light. It is possible, for example, to use the following as an acrylic binder: HELIZARIN FWT (BTC), or acrylic plastisols like DEGALAN BM 310 (DEGUSSA), the polyurethanes such as IMPRANIL DLN (BAYER), RHENAPRET FWP (THOR), INCOREZ W830/092, INCOREZ W830/397, INCOREZ W830/404/1 marketed by INDUSTRIAL COPOLYMER, or again EDOLAN LV, EDOLAN GS, and EDOLAN HT marketed by LANXESS, POLYTHAN PU 560, and POLYTHAN PU 605 marketed by POLYCOATING, the vinyl binders like polyvinyl acetate, RHENAPRET VEA, and also CARBOSET XPD 2856, and CARBOSET XPD 2852 marketed by NOVEON, or plastifiers such as SANTICIZER commercialized by DEGUSSA.

By way of an example, the polymer binder represents from 2% to 19% (m/m), and preferably from 4% to 14% (m/m) of the total mass of the lattice.

According to a preferred embodiment of the invention, the polymer binder used will exhibit a certain flexibility, as characterised by an extension at rupture, measured according to the DIN 53504 standard, that is equal to or greater than 600%. The inventors have demonstrated that, using such a polymer binder, the mobility of the photochromic pigment within the formulation is improved, enabling it to change state as often as possible.

In an advantageous manner, the formulation also includes an anti-UV stabilizer. This anti-UV stabilizer can be selected from among the HALSs (Hindered Amine Light Stabilizers) such as UVASIL 299 (Great Lakes), TINUVIN 765 or TINUVIN 144 (Ciba), SANDUVOR 3050 (Clariant), or indeed the UV absorbers like TINUVIN 327 (Ciba), SANDUVOR 3206 or SANDUVOR VSU (Clariant) or the de-activators marketed by DABCO. The anti-UV stabiliser is preferably present in the formulation, so as to represent from 0.05% to 0.4% (m/m), and preferably from 0.09% to 0.3% (m/m) of the total mass of the lattice.

The formulation can also include an anti-oxidant. IRGANOX 1076 (Ciba) is an example of an anti-oxidant that can be used in the formulation according to the invention. The anti-oxidant is preferably present in the formulation, so as to represent from 0.1% to 2% (m/m), and preferably from 0.2 to 1% (m/m) of the total mass of the lattice.

The following examples will enable the invention to be understood more clearly. In these examples, the quantity of the different constituents of the formulation are expressed as a percentage by mass of the liquid composition used, also called the formulation.

EXAMPLES

The performance parameters of the lattices according to the invention were assessed using the following method (known as the Test or Suntest in the remainder of the document):

The VT (visible transmission) is the proportion of visible light (400 to 800 nm) transmitted through the lattice. In order to measure this characteristic, use is made of a light meter (TESTO 545, commercialised by LABO and Co), with which the quantity of light is measured in lux.

The intensity I is determined by passing the light meter over a lattice impregnated with photochromic pigment and not protected by a visible UV filter.

Then, at $t_0$, and thereafter once every hour, three measurements are performed by placing the following between the cell and the lamp:

1—Light+filter+impregnated fabric+light meter
2—Light+impregnated fabric+filter+light meter
3—Light+filter+impregnated fabric+light meter Intensity measurement #2 corresponds to a darkening (denoted Ni), and intensity measurement #3 to a whitening (denoted Bi).

For each measurement (every hour) the following values are calculated:

$Dni=(Bi-1-Ni)/Bi-1$ $Bni=(Bi-Ni)/Ni$

→$D=Dni/Dn0$ and $B=Bni/Bn0$ where Bi corresponds to the whitening and Ni to the darkening, $VT=(1-Dni)$ at time i, the intensities being measured during measurement #2 and measurement #3 respectively.

Evaluation of the pigments was effected using the CPS Suntest (visual assessment) in the following conditions: $E=765$ W/m2 and use of a Xenon NXE 1500B lamp. The following different pigments were tested:

Blue PHOTOSOL® 0265, or Yellow PHOTOSOL® 5-3 marketed by PPG 10;
VARIACROL® Blue A commercialized by Clariant;
Midnight grey, REVERSACOL® ruby, REVERSACOL® sunflower, REVERSACOL® misty grey, REVERSACOL® 306, REVERSACOL® 219, REVERSACOL® 208, REVERSACOL® paltinate purple, REVERSACOL® plum red, and REVERSACOL® velvet blue, marketed by James Robinson.

Two types of polymer binders were used to test for non-degradation of the following photochromic pigments under the action of the light:

RHENAPRET VEA, IMPRANIL DLN and HELIZARIN FWT, polymer binders in the aqueous phase
Plastisol The formulations presented in Table 2 (which shows the percentages by mass of the different elements of the liquid formulation used) were employed.

TABLE 2

| Raw materials | Binder in aqueous phase % mass | Plastisol % mass |
|---|---|---|
| Pigment | 0.5 | 0.5 |
| Polymer binder (aqueous phase) | 99.5 | |
| Plastisol | | 99.5 |
| Total | 100 | 100 |

The plastisol-based formulations are applied onto a white glass-fibre fabric coated with PVC (reference screen 525, white—HEXCEL).

The aqueous formulations are applied onto a glass-fibre fabric, 7628 TR112 (HEXCEL).

A 30 μm wet film, formed with the formulation, is deposited by means of a film applicator onto a pane of glass, and then the treated fabric is placed onto this wet film. After drying for 3 minutes at 160° C., the mean treatment rate is 9% (m/m). Following this assessment, the pigments selected to evaluate the UV stabilisers and the antioxydants are Velvet Blue and the Midnight Grey, which exhibit the best stability over time.

This evaluation was also performed using the Suntest, with visual assessment. The formulations presented in Table 3 (which shows the percentage by mass of the different elements of the liquid formulation used) were employed.

TABLE 3

| Raw materials | Binder in aqueous phase % mass | Plastisol % mass |
|---|---|---|
| Velvet Blue | 0.5 | 0.5 |
| HALS | 0.5-1 | 0.5-1 |
| Anti-UV stabiliser | 0.5-1 | 0.5-1 |
| Deactivator | 1 | 1 |
| Antioxydant | 0.5-1 | 0.5-1 |
| Ethanol | 20-25 | |
| Water | 10-15 | |
| Helizarin FWT | 60-70 | |
| Plastisol | | 95.5-97 |
| TOTAL | 100 | 100 |

Whatever the matrix used, a slight increase in performance is observed in the Suntest.

Different binders were also tested, in order to increase the life expectancy of the photochrome. The latter is a function of the flexibility of the polymer. Different very flexible polyurethanes, whose characteristics are shown in Table 4, were used.

(D). Quantity of formulation deposited with the film applicator in the form of a wet film of from 10 μm to 30 μm in thickness.

Table 6 shows the percentages by mass of the different elements (A) to (D) of the liquid formulation used.

TABLE 4

| SUPPLIER | PRODUCT | TG1 ° C. | TG2 ° C. | TG3 ° C. | TG4 ° C. | Max extension | Modulus 100% (mPa) |
|---|---|---|---|---|---|---|---|
| BAYER | IMPRANIL DLN | −51 | −4.4 | 62.6 | | 700% | 2 |
| THOR | RHENAPRET FWP | −48.8 | 79.6 | | | No value | No value |
| INDUSTRIALCOPOLYMERS | W830/397 | −31.7 | 61.8 | | | 700% | 2 |
| INDUSTRIALCOPOLYMERS | W830/404/1 | −27.4 | 95.4 | | | 700% | 1.5 |
| LANXESS | EDOLAN LV | −45 | 18.9 | 46.5 | | 500% | 2.5 |
| " | EDOLAN GS | −3.8 | 52.7 | | | 650% | 1.3 |
| " | EDOLAN HT | −38.1 | 46.5 | | | 400% | 4 |
| " | EDOLAN LS | −15.9 | 73.4 | | | 720 | 0.7 |
| POLYCOATING | POLYTHAN PU 560 | −43.8 | 18.8 | | | 800% | 2 |
| " | POLYTHAN PU 605 | −51.8 | −3.1 | 52.9 | 79 | | |

The formulations presented in Table 5 (which shows the percentages by mass of the different elements of the liquid formulation used) were employed.

TABLE 5

| Raw materials | Binder in aqueous phase % mass |
|---|---|
| Reversacol midnight grey | 0.2 |
| HALS (Tinuvin 765) | 0.5 |
| Irganox 1076 | 1 |
| Texipol 5028 | 0.5 |
| Water | 47.8 |
| Polymer binder | 50 |
| Total | 100 |

TEXIPOL 5028 is an acrylic thickening agent which is used to make the application more homogeneous.

The formulation is applied by means of a film applicator (30 μm wet). Two tests are effected for each binder. The treated support is the natural white screen (OF 5%) commercialized by Hexcel Reinforcements, which is used as the reference.

All the samples are subjected to the test described previously.

Plastisol, which gives good performance in terms of coping with the Suntest, by visual assessment, is used as a reference.

Figure 2:
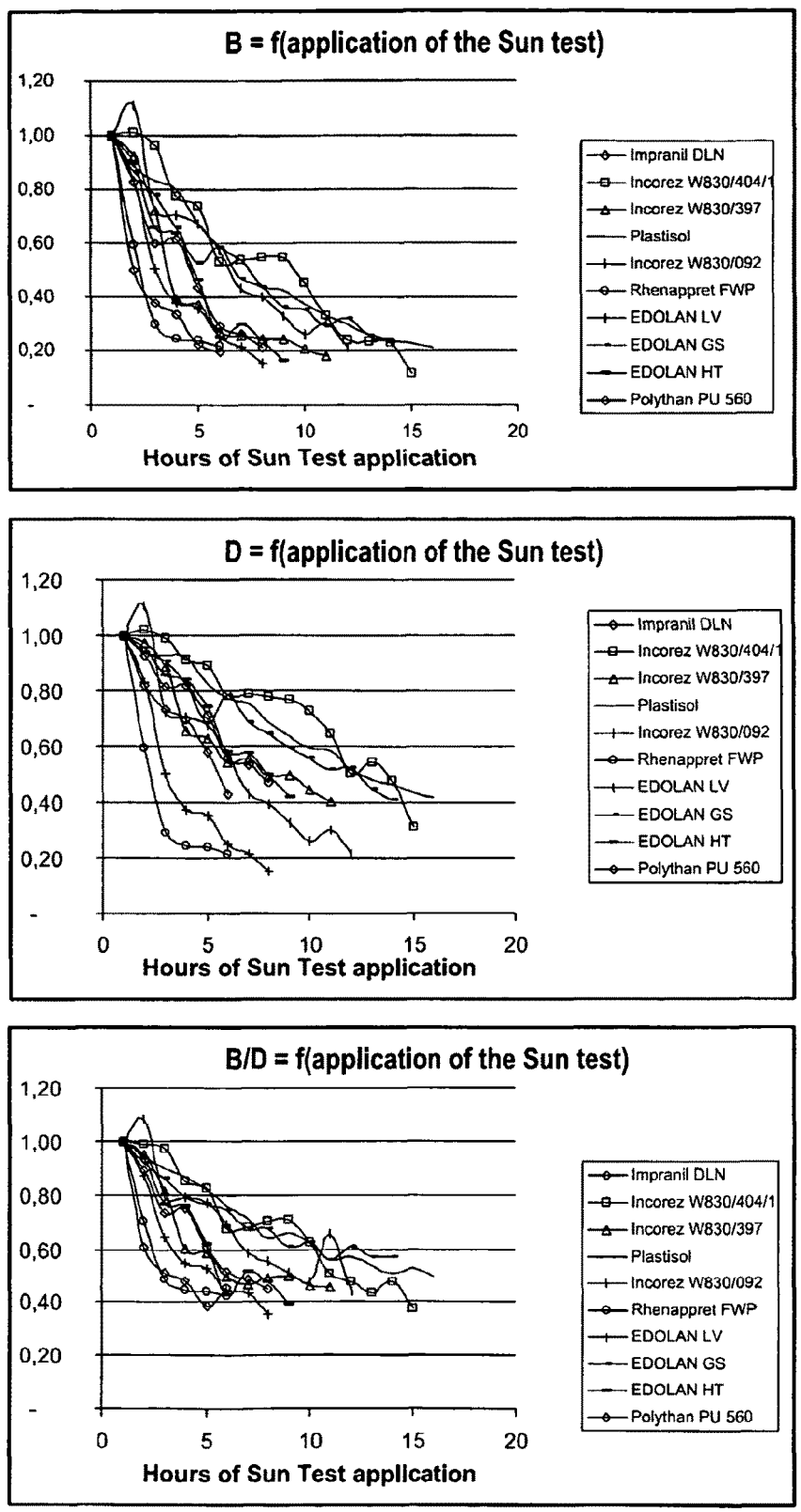
FIGS. 2 and 3 show the results obtained with the test described in the examples, using different lattices according to the invention.

The results presented in FIG. 2 show a significant difference between the polyurethane binders. The best life expectancy is obtained with two binders, namely INCOREZ W830/404/1 and EDOLAN GS.

Other tests were performed in order to optimize the life expectancy of the pigment, with the permutation of 4 parameters:

(A). Pigment concentration
Midnight grey from James Robinson, from 0.2% to 0.5% (m/m) of the formulation (B). Glass with UV filter [with and without]

(C). Antioxidant at a concentration of from 1% to 5% (m/m) of the formulation

TABLE 6

| Tests | (A) | (B) | (C) | (D) |
|---|---|---|---|---|
| 3 | 0.5 | With | 1 | 30 |
| 4 | 0.5 | With | 5 | 10 |
| 5 | 0.35 | Without | 3 | 15 |
| 9 | 0.2 | Without | 1 | 30 |
| 10 | 0.2 | Without | 5 | 10 |

In every case, the formulation contains
aliphatic PU
Water
HALS
Antioxidant
Pigment
Thickener
The formulations used are as follows:

| | Test 3 | | | |
|---|---|---|---|---|
| | M theor. | M actual | % theor. | % actual |
| INCOREZ W830/404/1 | 10.00 | 10.01 | 50.00 | 49.96 |
| Water | 9.50 | 9.50 | 47.50 | 47.42 |
| TINUVIN 765 | 0.10 | 0.10 | 0.50 | 0.50 |
| IRGANOX 1076 | 0.20 | 0.21 | 1.00 | 1.05 |
| Midnight Grey | 0.10 | 0.11 | 0.50 | 0.52 |
| TEXIPOL 5028 | 0.10 | 0.11 | 0.50 | 0.55 |
| UV glass | yes | | | |
| Film applicator | 30 | | | |

| | Test 4 | | | |
|---|---|---|---|---|
| | M theor. | M actual | % theor. | % actual |
| INCOREZ W830/404/1 | 10.00 | 10.01 | 50.00 | 49.90 |
| Water | 8.70 | 8.73 | 43.50 | 43.51 |

-continued

Test 4

|  | M theor. | M actual | % theor. | % actual |
|---|---|---|---|---|
| TINUVIN 765 | 0.10 | 0.12 | 0.50 | 0.60 |
| IRGANOX 1076 | 1.00 | 1.00 | 5.00 | 4.98 |
| Midnight Grey | 0.10 | 0.10 | 0.50 | 0.51 |
| TEXIPOL 5028 | 0.10 | 0.10 | 0.50 | 0.50 |
| UV glass | yes | | | |
| Film applicator | 10 | | | |

Test 5

|  | M theor. | M actual | % theor. | % actual |
|---|---|---|---|---|
| INCOREZ W830/404/1 | 10.00 | 10.02 | 50.00 | 49.95 |
| Water | 9.13 | 9.14 | 45.65 | 45.56 |
| TINUVIN 765 | 0.10 | 0.12 | 0.50 | 0.60 |
| IRGANOX 1076 | 0.60 | 0.60 | 3.00 | 2.99 |
| Midnight Grey | 0.07 | 0.07 | 0.35 | 0.36 |
| TEXIPOL 5028 | 0.10 | 0.11 | 0.50 | 0.55 |
| UV glass | No | | | |
| Film applicator | 15 | | | |

Test 9

|  | M theor. | M actual | % theor. | % actual |
|---|---|---|---|---|
| INCOREZ W830/404/1 | 10.00 | 10.02 | 50.00 | 50.03 |
| Water | 9.56 | 9.56 | 47.80 | 47.73 |
| TINUVIN 765 | 0.10 | 0.11 | 0.50 | 0.55 |
| IRGANOX 1076 | 0.20 | 0.20 | 1.00 | 1.00 |
| Midnight Grey | 0.04 | 0.04 | 0.20 | 0.20 |
| TEXIPOL 5028 | 0.10 | 0.10 | 0.50 | 0.50 |
| UV glass | No | | | |
| Film applicator | 30 | | | |

Test 10

|  | M theor. | M actual | % theor. | % actual |
|---|---|---|---|---|
| INCOREZ W830/404/1 | 10.00 | 10.04 | 50.00 | 50.02 |
| Water | 8.76 | 8.76 | 43.80 | 43.65 |
| TINUVIN 765 | 0.10 | 0.10 | 0.50 | 0.50 |
| IRGANOX 1076 | 1.00 | 1.01 | 5.00 | 5.03 |
| Midnight Grey | 0.04 | 0.04 | 0.20 | 0.20 |
| TEXIPOL 5028 | 0.10 | 0.12 | 0.50 | 0.60 |
| UV glass | No | | | |
| Film applicator | 10 | | | |

Figure 3:
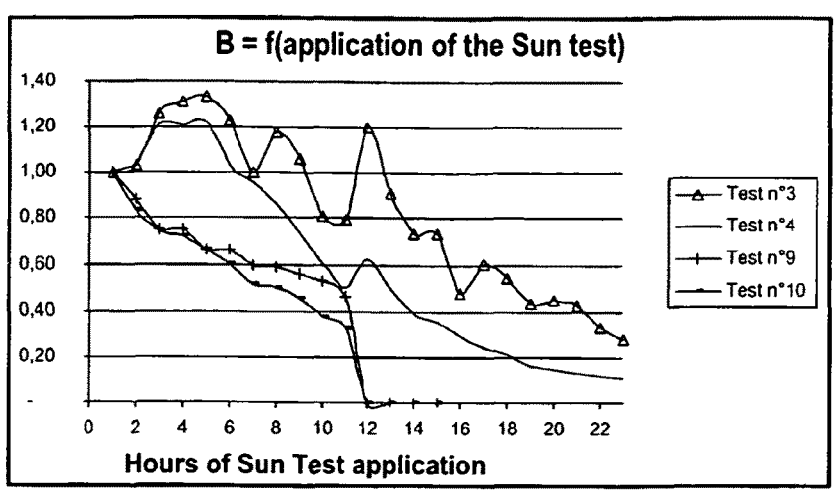
Figure 3:
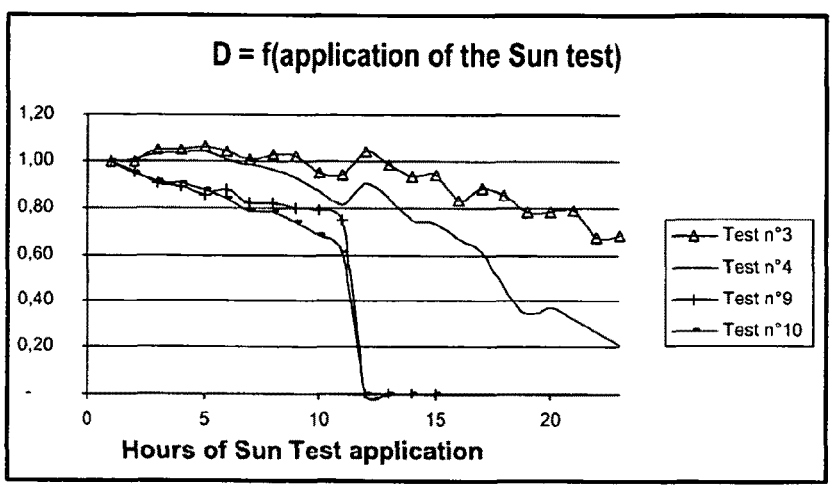
Figure 3:
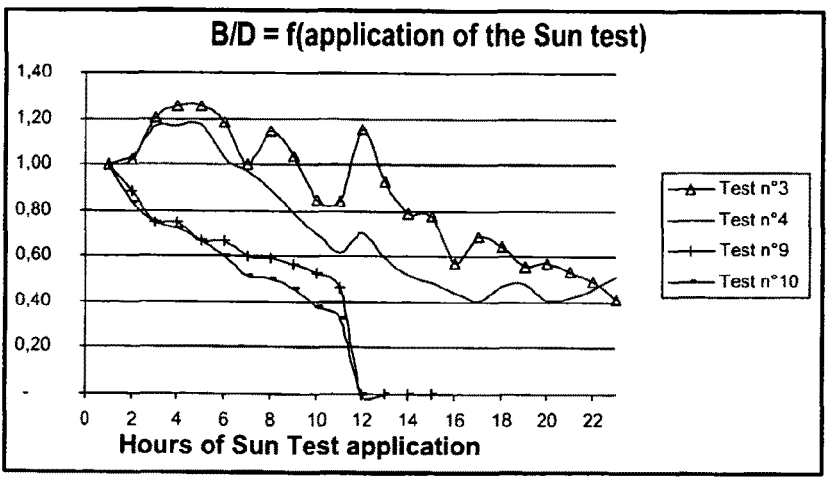

The results obtained for the Test in test 3 are presented in FIG. 3, and show that the UV filter improves the performance over time of the behaviour of the lattice.

Figure 4:
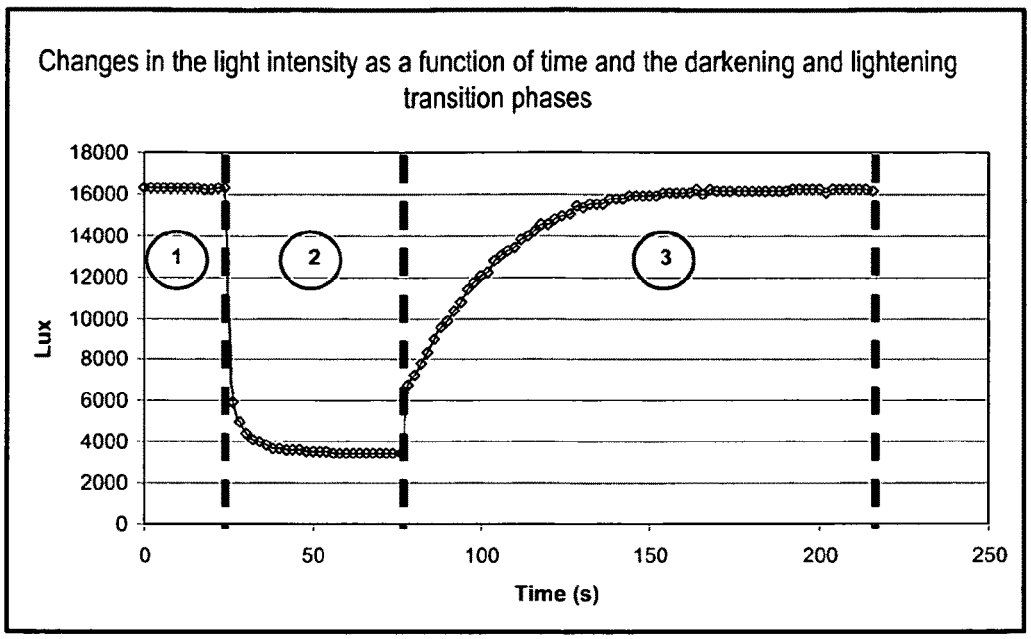
FIG. 4 shows the changes in the light intensity as a function of time and the lightening and darkening transition phases in the case of test 3, presented in the examples.

FIG. 4 shows the changes in the light intensity as a function of time and of the lightening and darkening transition phases in the case of test 3. Phase 1 corresponds to lightening of the lattice, phase 2 to darkening of the lattice, and phase 3 to lightening of the lattice. The initial VT (Ni/Bi) is 21%.

Figure 5:
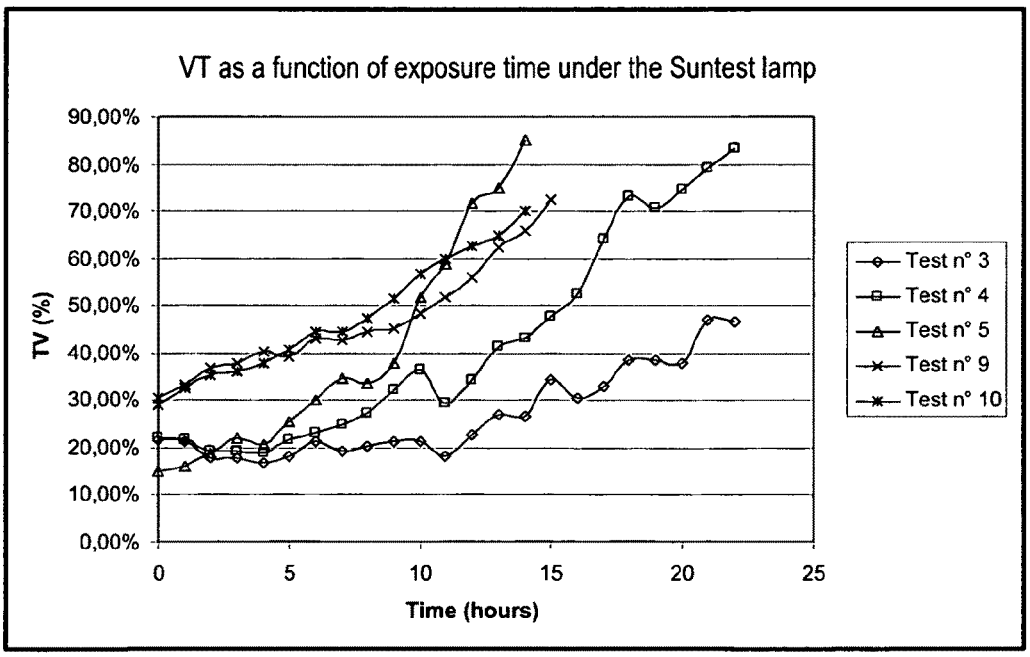
FIG. 5 shows the changes in visible transmission over time, obtained in the different tests presented in the examples.

FIG. 5 shows the changes in visible transmission (VT) over time, as measured in the different tests.

What is claimed is:

1. A lattice for forming a light-attenuation screen, said lattice comprising at least two layers of crossed threads or fibres combined to form an open grid with a given openness factor, the layers being coated with a formulation that includes a polymer binder and a photochromic organic pigment.

2. A lattice according to claim 1, wherein the photochromic organic pigment is selected from a spiropyrane, a spiro-oxazine, a chromene, a fulgide, a fulgimide, a diarylethene, a quinone, a viologen, a perimidinespirocyclohexadienione, and their derivatives.

3. A lattice according to claim 1, wherein the photochromic organic pigment is selected from a spiro-oxazine, a naphro-pyran, and a naphto-oxazine.

4. A lattice according to claim 1, wherein the photochromic organic pigment represents from 0.05% to 0.4% (m/m) of a total mass of the lattice.

5. A lattice according to claim 1, wherein the polymer binder is selected from a thermoplastic polymer, a heat-hardened polymer, and mixtures thereof.

6. A lattice according to claim 1, wherein the polymer binder is selected from vinyl, acrylic or polyurethane binders.

7. A lattice according to claim 1, wherein the polymer binder exhibits flexibility as measured by an extension at rupture, according to standard DIN 53504, that is equal to or greater than 600%.

8. A lattice according to claim 1, wherein the polymer binder represents from 2% to 19% (m/m) of a total mass of the lattice.

9. A lattice according to claim 1, wherein the formulation includes an anti-UV stabilizing agent.

10. A lattice according to claim 9, wherein the anti-UV stabilizing agent represents from 0.05% to 0.4% (m/m) of a total mass of the lattice.

11. A lattice according to claim 1, wherein the formulation includes an anti-oxidant.

12. A lattice according to claim 11, wherein the anti-oxidant represents from 0.1% to 2% (m/m) of a total mass of the lattice.

13. A lattice according to claim 1, wherein the threads of the layers are combined by a weaving process.

14. A lattice according to claim 1, wherein the openness factor is between 2 and 20%.

15. A lattice according to claim 1, wherein the formulation represents from 3% to 20% (m/m) of a total mass of the lattice.

16. A lattice according to claim 1, wherein the threads comprise glass fibre.

17. Blinds comprising the lattice according to claim 1.

18. A method for manufacturing the lattice according to claim 1, said method comprising treating the threads in the layers constituting the open grid with a formulation that includes a polymer binder and a photochromic organic pigment.

19. Curtains comprising the lattice according to claim 1.

20. The lattice of claim 1, wherein said formulation comprises said polymer binder that exhibits flexibility as measured by an extension at rupture, according to standard D1N 53504, that is equal to or greater than 600% and said pigment, wherein the formulation of the lattice provides self-regulation of a color of the lattice as a function of a quantity of light received by the lattice.

* * * * *